June 15, 1937.                J. R. BARDSLEY                2,084,123
                              LOADING COIL CASE
                           Filed March 1, 1935              2 Sheets-Sheet 2

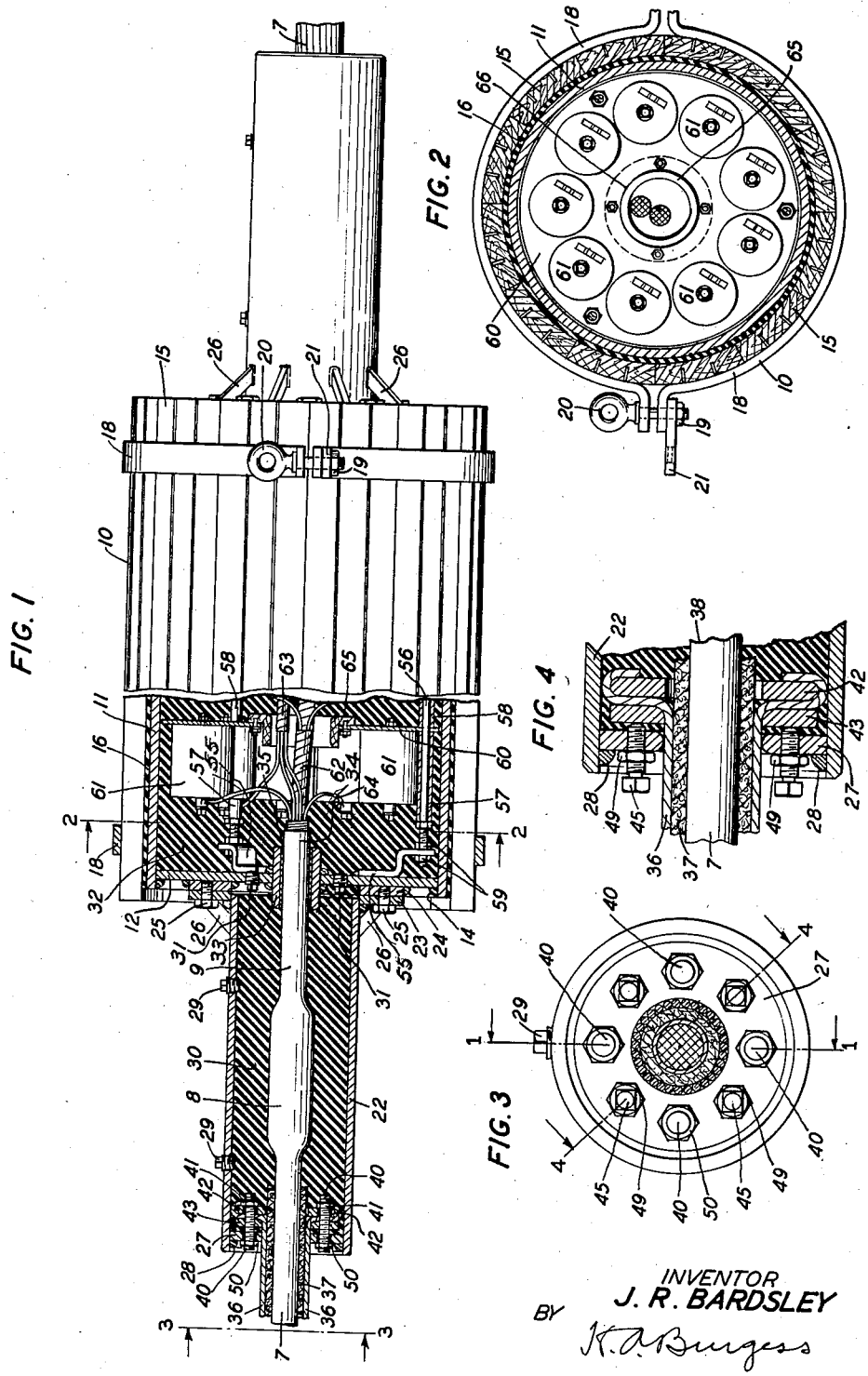

INVENTOR
J. R. BARDSLEY
BY
ATTORNEY

Patented June 15, 1937

2,084,123

UNITED STATES PATENT OFFICE 2,084,123

LOADING COIL CASE

Joseph R. Bardsley, Yonkers, N. Y., assignor to Bell Telephone Laboratories, Incorporated, New York, N. Y., a corporation of New York Application March 1, 1935, Serial No. 8,873

12 Claims. (Cl. 178—46)

This application relates to inductance devices for use in telephony or the like and relates more particularly to arrangements for housing and protecting loading coils and to the connections between the conductors and the loading coil structures.

It is an object of this invention to provide a loading coil case adapted for use under water over a long period of time without need for repairs.

It is an object of this invention to produce a loading coil case of compact character and one adapted for ready handling.

A feature of the invention consists in the arrangement of loading coils on spaced shelves or annular mounting plates, the coils being in individual containers arranged in a circle on the mounting plate around centrally arranged stub cables which pass through holes in the centers of the plates.

Another feature of the invention involves improved means for closing the case proper after filling, thereby protecting the interior of the loading coil chamber and the internal wiring.

An added feature involves means for directly tensioning the armor on a connecting cable, thereby relieving any tension in the cable lead sheath.

A further feature of the invention is a reliable means of fastening a main cable to the loading coil case and the water-proofing of the fastening means simultaneously with the water-proofing of the splice between the stub cable in the loading coil case and the main communication cable, and the sealing of a closure means for the loading coil case proper.

These and other features of the invention will be apparent from the illustrative embodiment described in the present specification and shown in the drawings in which:

Fig. 1 shows the loading coil case and the housings for the end splices partly sectioned to the main coil chamber and a splice chamber along the line 1—1 of Fig. 3;

Fig. 2 shows a cross-section of a main chamber on the line 2—2 of Fig. 1;

Figure 5:
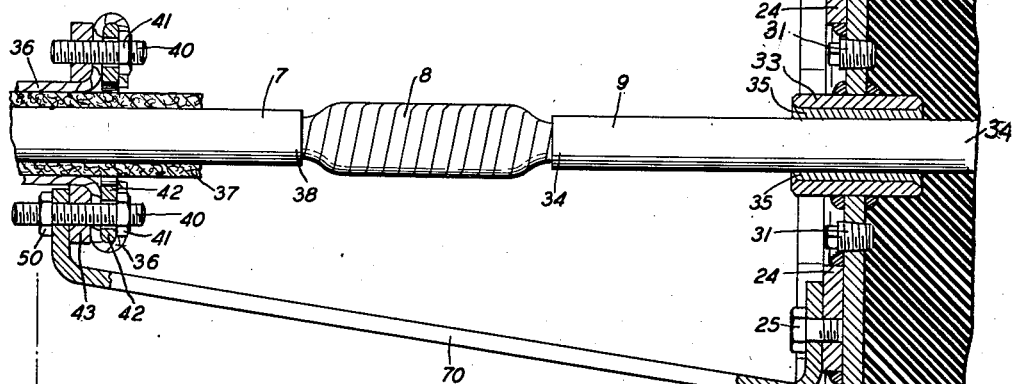
Figure 6:
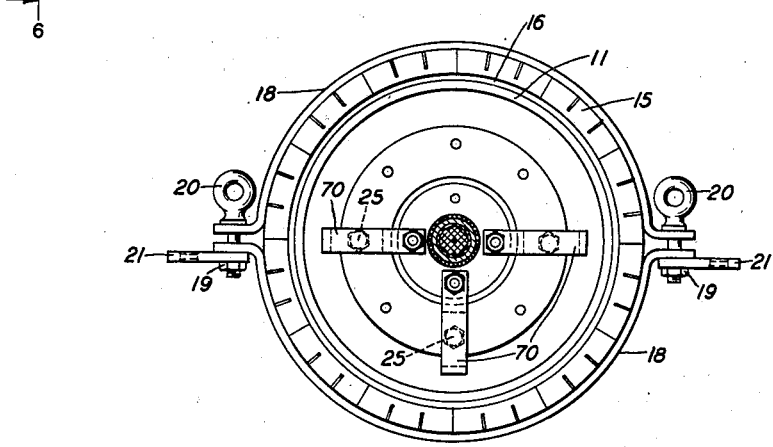

Fig. 3 taken on the line 3—3 of Fig. 1 shows an end view of the means for holding and for tensioning the armor on the cable;

Fig. 4 taken on the line 4—4 of Fig. 3 shows a section of the armor clamping plates and means for putting tension on armor wires;

Fig. 5 is a temporary erection arrangement showing erection members employed in holding the armor clamp arrangements in a predetermined relationship to the coil case during splicing of the main cable to the case stub cable and Fig. 6 is an end view taken on line 6—6 of Fig. 5.

Referring to the drawings for a disclosure of detailed features of the illustrative embodiment of the invention, there is shown an armored lead covered cable 7 spliced at 8 to a lead covered stub cable 9 extending from a loading coil case 10. This loading coil case 10 is formed from a shell or a metallic cylinder 11 having circular heads 12 welded as at 14 into the cylinder 11 to form a strong water-tight connection between the shell 11 and each end closing head 12. The outer structure of the loading coil shell or housing is completed by a casing of wood slats or lagging 15 slotted externally to bend around and fit around the circular shell of the loading coil housing 11. These slats are retained against a plastic water-proofing substance in a layer 16 by metal hoop members 18, semi-circular in form. These half hoops 18 are bolted together around the slats 15 pinching them tightly in place with the aid of nuts 19 on eye-bolts 20. These eye-bolts 20 are adapted to cooperate with hooks employed with a derrick device or the like for lifting the casing and attached cable sections from the deck of a ship or barge and lowering the assembly into the water when the casing is to be first placed in position under water. Optionally or additionally a number of cleats, links or as shown oblong plates 21 perforated with two holes may be secured to these eye-bolts 20 for the purpose of carrying chains useful in lowering the case into position and to be laid subsequently extending at right angles to the main line of the cable to rest on the bottom of the river, bay or ocean. These chains may be grappled from a boat to get possession of the loading coil case if the loading case needs to be recovered and brought above the water for repairs.

The splice 8 between the main cable 7 and the stub cable 9 extending from the loading case is protected or encased in a cylindrical housing or splice chamber 22 having an annular plate 23 welded at one end by which it is to be secured to the end of the loading coil casing. An annular plate 24 welded to the closing head 12 of the loading coil case is tapped for bolts 25, fastening the parts together by passing through the plate 23 attached to the cylindrical housing or splice chamber 22. The plate 23 is braced from the splicing chamber housing by struts 26 welded to the plate 23 and extending at an angle to the point where each one is welded to the outer wall of the cable splice housing 22. A centrally bored plate member 27 is welded to cylinder 22 at 28 to furnish a head closure and complete the splicer housing. Holes or ports in the upper side of the splice housings are closed by plugs 29 after the filling of the splice chamber with a hot water-proofing impregnating material 30 which is fluid at high temperature but relatively hard at ordinary temperatures. This filling material protects all points of entrance through which water might leak into the main loading case 10. The viscous fluid coating seals the plugs 31 in ports in the head plate 12 through which the casing was originally filled with similar viscous impregnating compound 32 and also seals the space or area around the sleeve or nipple 33 which is welded to both sides of the head 12 and to which the lead sheath 34 of the stub cable 9 is soldered as at 35.

Clamping means to be disposed within the splice chamber 22 holds the armor wires 36 seen on the outside of the main cable which armor is embedded in fibrous material such as jute 37 both being arranged to protect the lead sheath 38 over the insulated conductor wires of the main cable. Tension means prevents any possibility of longitudinal stress or strain being placed on the lead covering of the cable 7 or stub cable 9 or on the splice 8 arranged between these cables. The armor wires are turned outwardly for the clamp connection and held by armor clamping studs 40 and nuts 41 between an inner plate 42 and an outer plate 43 into which the studs are tapped and later welded if necessary. The loose ends of the armor are hammered down flat against the inside face of the plate 42. This, of course, tends to fracture the zinc or galvanized coating applied to the armor wire which as a result would normally rust through unless the exposed metal surfaces were water-proofed. Adjusting screws 45 for applying the longitudinal tension to the armor are set in tapped holes in the head 27. After assembly of cylindrical housing 22, rigid with the head 12 of the loading coil housing, the screws 45 may be tightened to put a satisfactorily high tension on the armor wires. The lock-nuts 49 are tightened to prevent rotation of the adjusting screw 45 which would permit loosening of the tension on the armor wires. Nuts 50 on armor clamping studs 40 furnish an outer closing means to the space around bolt 40 and head 27 and tend to lock the armor clamping arrangement rigidly in position.

The loading coil units in the main chamber are supported within the loading coil housing free of contact with its outer walls. The interior walls of each head closure or plate member 12 of the loading coil housing 10 are provided with three metal brackets 55, welded thereto and perforated adjacent their outer ends. These bracket members cooperate in pairs for mounting of long rods 56 suitably threaded and held extending between these brackets on opposite ends of the case and throughout the length of the housing. Pipe spacers such as 57 and 58 of suitable unlike lengths telescope over these long rods 56 and are rigidly held in place by nuts 59. These pipe sections space annular mounting plates 60 along the length of the rods 56. Bolted to these plates 60 are circularly arranged loading units connected much as in Quinlan Patent 1,895,487. Stub cable conductors 62 and 63 extend from opposite ends of the casing passing through central circular holes in the steel mounting plates and the quadded conductors 64 extend from the stub cable to the proper terminals mounted on the top or free ends of the loading units 61.

An insulating collar 65 surrounds the stub cable conductors where they pass through the central perforation 66 in the mounting plate 60. Each collar has a flange at one end which is drilled for screws rigidly fastened into the mounting plate 60. The collars are sufficiently long to prevent the wires contacting the mounting plate. Each collar is rounded and smoothed internally to prevent any abrasion of the paper insulated wires resulting in possible damage to the finished structure by short-circuiting or the like. The rounded interior of these insulating collars prevents contact of the insulation of the stub cable with any sharp corners or edges. Each of the unit containers holding three loading coils forming a loading unit is filled with waterproofing viscous material. The entire interior of the coil housing subsequent to assembly is similarly impregnated with a water-proofing compound through end holes plugged afterwards with the plugs 31.

The manner or method of assembly of the loading coil structure to the main cable is to first remove the splice chamber 22 from the loading case proper as it is received on the job, bolted in position on the main chamber 10. The main cable 7 having been raised to suitable position and supported is passed through end plate 27 of the splice chamber 22 and the splice chamber is then slipped back over the cable out of the way. The main cable 7 is then passed through the hole in armor clamping plates 41 and 43 spreading the armor wires between the plates. The main cable is then cut off suitably for the operation of splicing its conductor wires to the proper conductor wires in the stub cable extending from the loading coil housing 10. Three bracket like iron members 70 are used temporarily during installation of the loading case and these are bolted by three of the machine bolts 25 to the annular plate 24 secured to the closure 12 of the main chamber loading coil case. The bracket members 70 fix the position of the armor clamping rings 42 and 43 with respect to the inner end of the splice chamber 22 and permits clamping of the armor wires between rings 42 and 43 by tightening of the nut 41 against the inner clamping plate 42. With the armor and main cable held rigidly in position by the brackets, the splice between the main cable and the stub cable can be readily made and be covered with insulation and with a lead sleeve in the regular way. The bracket members 70 are then removed and have no further use. The splice chamber, shell or housing 22 with its rigidly welded end plate 27 is then slipped back over the cable until it covers splice 8 and can be secured by machine bolts 25 to the annular plate 24 and to the loading coil housing. With the shell of the splice chamber held rigidly in place, the adjusting screws 45 are tightened to place tension on the armor wires and the lock nuts 49 are tightened to secure them in place. Following impregnation of the splice chamber or chambers 22, with the water resistant fluid such as asphalt, tar, bitumen, rosin oil or any mixtures adapted to always adhere to the metals, the plugs 29 are inserted to seal the interior of the splice chamber against loss of the impregnating material and against ingress of water at the pressures that may exist in the positions where the loading coil may be used.

It is understood that the casing may be of various special shapes as well as cylindrical.

What is claimed is:

1. A loading coil case for an armored cable, a splice chamber at one end of the loading coil case for protecting a splice connection to a main cable and having means for fastening the armor wires of the cable to the splice chamber, and means for directly tensioning the armor wires to cause them to resist a pull that might cause movement or a strain on the cable or splice within the splice chamber.

2. A loading coil case for a lead covered armored cable having a splice chamber mounted at one end of the loading coil case proper, an aperture for filling the case proper with impregnating material, said aperture being located in one head of the case in a position to be within the splice chamber and to be covered with a material to be employed in impregnating the inside of the splice chamber.

3. A loading coil case for an armored cable having a splice chamber mounted at each end of the loading coil case adapted to be filled with waterproof compound and having the sole means for filling the loading coil case with impregnating material arranged inside of one of the splice chambers to be protected thereby against moisture.

4. A loading coil case for an armored submarine cable having a splice chamber at each end, adjustable means in connection with each splice chamber for holding the armor, said adjustable means being arranged to draw the armor wires into said splice chamber under tension so that in filling the splice chamber with water resistant material, the armor wires will be covered and due to the absence of relative movement between the cable and the casing will remain covered even when placed under tension in laying the cable and casing under water.

5. A loading coil case with a splice chamber at one end, armor wire tensioning means at the outer end of the splice chamber arranged to hold the armor ends folded and clamped at a position well within the splice chamber, port means for access to the interior of the loading coil case proper through one head of the loading coil case but within the splice chamber, plugs for said port means and holes in the splice chamber for filling the splice chamber in a manner to insure complete covering of the bends in the cable armor arranged within and adjacent one end of the chamber and of the plugs for the ports in the loading coil case at the other end of the chamber.

6. A loading coil case for lead covered cables, a centrally perforated head member for the case, a sleeve sealed and held into the perforation in the head member and telescoped over the lead covered cable, a soldered joint between the lead covered cable and the sleeve and means to prevent tension on the lead covered cable and the sleeve.

7. A loading coil case comprising a shell container of substantially cylindrical form, mounting plate members supported within the casing spaced from one another, loading units, each mounting plate supporting a group of said units with each unit secured at one extremity to its corresponding plate, an approximately centrally disposed hole in each mounting plate and a stub cable structure passing through the centrally disposed hole with leads to each unit.

8. A loading coil casing comprising a substantially cylindrical shell, end closing members for the shell, bracket members mounted on the end closure members, rods supported between opposite bracket members, mounting plates carried on the rods and pipe spacers telescoping over the rods to space the plates from one another.

9. Apparatus for splicing and assembling an armored cable to a loading coil case provided with a stub cable extending outwardly from the loading coil case, said apparatus including a pair of clamping plates arranged to hold the armor wires of the cable radiating outwardly from the line of the cable, said plates being centrally perforated for the passage of the cable and clamped together under pressure against the armor wires, bent strap members to hold the assembled clamping plates in proper relationship to the loading coil case during splicing of the main cable to the stub cable and a housing adapted to pass over the spliced joint between the main cable and stub cable, said housing being adapted to fasten the clamping assembly to the loading coil housing to retain the cable in rigid relationship with the loading coil case.

10. Apparatus for assembling an armored cable to a loading coil case as in the preceding claim wherein the housing for covering the splice has an end plate perforated for passage of the armored cable therethrough, said end plate of the housing having bolts running therethrough for forcing the clamping plate assembly inwardly to tension the armor wire and relieve the load of the coil case from the lead sheathing of the lead covered cable to prevent relative movement between the main cable and the loading coil case and to prevent cracking of the lead sheath.

11. In a loading coil case for lead covered cables, a centrally perforated head member for the case, a sleeve sealed and held into the perforation of the head member, and telescoping over a portion of the lead covered cable, a soldered joint securing the lead covering of the cable to the sleeve and adjustable means arranged to relieve tension on the lead covering of the cable at its rigid connection to the sleeve.

12. A loading coil case comprising a shell container, mounting plate members supported within the container spaced from one another, a plurality of loading coil units individually bolted to each of the mounting plate members, an approximately centrally disposed hole in each mounting plate and a stub cable structure passing through the hole in each mounting plate with lead wires going to the individual units.

JOSEPH R. BARDSLEY.